(12) United States Patent
Rajadeva et al.

(10) Patent No.: US 12,093,710 B2
(45) Date of Patent: Sep. 17, 2024

(54) INTEGRATED AUTHENTICATION FOR CONTAINER-BASED ENVIRONMENT

(71) Applicant: International Business Machines Corporation, Armonk, NY (US)

(72) Inventors: Ahilan Rajadeva, Monroe Township, NJ (US); Al Chakra, Apex, NC (US); Constantinos Kassimis, Cary, NC (US); Christopher Meyer, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 743 days.

(21) Appl. No.: 17/128,299

(22) Filed: Dec. 21, 2020

(65) Prior Publication Data
US 2022/0197680 A1 Jun. 23, 2022

(51) Int. Cl.
*G06F 9/455* (2018.01)
*G06F 16/11* (2019.01)
*G06F 21/44* (2013.01)

(52) U.S. Cl.
CPC ........ *G06F 9/45558* (2013.01); *G06F 16/116* (2019.01); *G06F 21/44* (2013.01); *G06F 2009/45587* (2013.01)

(58) Field of Classification Search
CPC .... G06F 9/45558; G06F 16/116; G06F 21/44; G06F 21/602; G06F 21/30; G06F 2009/45587
See application file for complete search history.

(56) References Cited

U.S. PATENT DOCUMENTS

| 8,214,639 | B2 | 7/2012 | Leichsenring et al. |
| 8,826,013 | B1* | 9/2014 | Kodukula ............... G06F 21/53 707/823 |

(Continued)

FOREIGN PATENT DOCUMENTS

CN    105099706 A    11/2015

OTHER PUBLICATIONS

IBM Websphere Portal, "Credential Vault", 2004, 10.1 Overview, 5 pages, https://flylib.com/books/en/4.455.1.79/1/.

(Continued)

*Primary Examiner* — Dereena T Cattungal
(74) *Attorney, Agent, or Firm* — CANTOR COLBURN LLP; Teddi Maranzano (57) ABSTRACT

Techniques for integrated authentication for a container-based environment are described herein. An aspect includes accessing, by an application that is running in a container in a container environment that is hosted by a hypervisor on a host system, an authentication module that is located in the container environment. Another aspect includes invoking an authentication handler in the container environment based on the accessing of the authentication module. Another aspect includes passing control to the hypervisor from the authentication handler. Another aspect includes retrieving a security artifact from a security database of the host system by the hypervisor. Another aspect includes providing the retrieved security artifact to the application via the authentication handler. Another aspect includes performing an authentication operation by the application using the security artifact.

17 Claims, 7 Drawing Sheets

(56) References Cited

U.S. PATENT DOCUMENTS

| | | | |
|---|---|---|---|
| 8,856,782 B2* | 10/2014 | Ghosh | G06F 9/45533 |
| | | | 718/1 |
| 9,065,804 B2* | 6/2015 | Sweet | H04L 63/0807 |
| 9,135,050 B2* | 9/2015 | Kothari | G06F 9/45558 |
| 9,819,497 B2 | 11/2017 | Gunti et al. | |
| 9,935,772 B1 | 4/2018 | Madisetti et al. | |
| 10,698,710 B2 | 6/2020 | Doane et al. | |
| 2012/0054486 A1 | 3/2012 | Lakkavalli et al. | |
| 2016/0034298 A1 | 2/2016 | Doane et al. | |
| 2016/0182458 A1* | 6/2016 | Shatzkamer | H04L 63/0428 |
| | | | 713/168 |
| 2016/0292431 A1* | 10/2016 | Sreekanti | G06F 21/602 |
| 2016/0315926 A1* | 10/2016 | Agarwal | H04L 63/06 |
| 2017/0005808 A1 | 1/2017 | Gunti et al. | |
| 2017/0046181 A1* | 2/2017 | Williams | H04L 63/0823 |
| 2017/0257357 A1* | 9/2017 | Wang | H04L 9/12 |
| 2018/0103053 A1* | 4/2018 | Ghosh | G06F 21/554 |
| 2020/0387598 A1* | 12/2020 | El-Moussa | G06F 21/53 |
| 2022/0179674 A1* | 6/2022 | Goel | G06F 9/45558 |
| 2024/0095338 A1* | 3/2024 | Levinson | G06F 9/455 |

OTHER PUBLICATIONS

IBM, RACDCERT ADD, 2014, 17 pages, https://www.ibm.com/support/knowledgecenter/SSLTBW_2.1.0/com.ibm.zos.v2r1.icha400/le-add.htm#le-add.

Krzyzanowski, "Special Devices and File Systems", 2012, 9 pages, https://www.cs.rutgers.edu/~pxk/416/notes/14-specialfs.html.

Stack Overflow, LDAP store SSL certificate, 2020, 6 pages, https://stackoverflow.com/questions/33366433/ldap-store-ssl-certificate.

Tutorials Teacher, "SSL Certificate Formats", 2020, 6 pages, https://www.tutorialsteacher.com/https/ssl-certificate-format.

Wikipedia, "Device file", 2020, 16 pages, https://en.wikipedia.org/wiki/Device_file.

International Search Report and Written Opinion for International Application No. PCT/CN2021/124865; International Filing Date: Oct. 20, 2021; Date of Mailing: Jan. 26, 2022; 9 pages.

* cited by examiner

INTEGRATED AUTHENTICATION FOR CONTAINER-BASED ENVIRONMENT

BACKGROUND

The present invention generally relates to computer systems, and more specifically, to integrated authentication for a container-based environment.

In a cloud computing environment, computing is delivered as a service rather than a product, whereby shared resources, software, and information are provided to computers and other devices as a metered service over a network, such as the Internet. In such an environment, computation, software, data access, and storage services are provided to users that do not require knowledge of the physical location and configuration of the system that delivers the services.

A physical computer that is part of a virtualized computer environment can be referred to as a host. The virtualized computer environment, such as may be implemented in a physical cloud computing node of a cloud computing environment, can include a host operating system (OS) and one or more guest OSes. The host operating system can include a common base portion that supports a set of virtualized container environments that run on the physical computer. The common base portion may be referred to as a hypervisor. Each container environment can run a guest operating system and can support a number of containers. Each container can support one or more applications.

SUMMARY

Embodiments of the present invention are directed to for integrated authentication for a container-based environment. A non-limiting example computer-implemented method includes accessing, by an application that is running in a container in a container environment that is hosted by a hypervisor on a host system, an authentication module that is located in the container environment. The method also includes invoking an authentication handler in the container environment based on the accessing of the authentication module. The method also includes passing control to the hypervisor from the authentication handler. The method also includes retrieving a security artifact from a security database of the host system by the hypervisor. The method also includes providing the retrieved security artifact to the application via the authentication handler. The method also includes performing an authentication operation by the application using the security artifact.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

DETAILED DESCRIPTION

One or more embodiments of the present invention provide integrated authentication for a container-based environment. In order to perform authentication operations in a virtualized container environment, duplication of public and private certificate security artifacts (e.g., certificates and/or private keys) can be required. The duplicated security artifacts can be copied into well-known directories and file locations inside the guest OS, so that a guest OS and associated containers in the virtualized container environment can use those security artifacts for certificate verification and authentication. During the provision of the virtual environment, copies of any certificates can be injected into the virtual environment, and the virtual environment can place the certificates at the appropriate directory locations. However, for a cloud system that includes multiple instances of a guest OS, the security artifacts may be copied separately into each instance, which may require active management of the copied security artifacts in order to ensure that the copied security artifacts remain current throughout operation of the cloud system. Such security artifact management may be relatively complex, particularly for a virtualized container environment in an immutable appliance form.

Embodiments of integrated authentication for a container-based environment can integrate authentication operations for a virtualized container environment including a guest OS directly with underlying host OS security database (DB) that stores security artifacts without needing to duplicate the security artifacts in the virtualized container environment. The authentication operations can include, but are not limited to, transport security layer/secure socket layer (TLS/SSL) connections, lightweight directory access protocol (LDAP) connections, and hypertext transfer protocol secure (HTTPS) proxy server connections. The guest OS and host OS can each be any appropriate OS; in some embodiments of the invention, the host OS can be z/OS®, and the guest OS can be Linux®.

Embodiments of integrated authentication for a container-based environment can include an authentication module including an authentication file, or authentication file system, and an authentication handler. The authentication file or authentication file system can include a mapping of security artifacts, including but not limited to certificates and key rings (e.g., a resource access control facility, or RACF, keyring) that is provided as a placeholder at any appropriate directory locations in the guest OS. When the authentication file or authentication file system is accessed by an application running in a container in the virtualized container environment, the authentication handler is invoked to communicate locally with the underlying host OS to request the security artifact corresponding to the access from an underlying host security database (DB). Multiple instances of a guest OS can access the security artifacts in the security DB via each instance's respective authentication handler, such that provision of copies of the security artifacts throughout the system may not be required. In some embodiments, the authentication handler can implement a store hypervisor information (STHYI) instruction that allows the guest OS to communicate directly with the host OS environment without requiring network access. The virtualized container environment can run as a started task under a user identifier (ID) on the host environment, and the user ID can be used for authentication with the security DB to access a requested security artifact and convert the security artifact into any format that is required by the virtualized container environment.

Embodiments of the invention allow access to a secure centralized security DB, including a certificate and key store, that belongs to a hypervisor (i.e., a host operating system) and is stored in a native storage format of the hypervisor to be transparently accessible in real time to a number of instances of a guest OS via the guest OS's native interfaces, such that there is no need to statically export and store the keys and certificates into the formats used by the guest OS. Translations and conversions of security artifacts between the native formats of the hypervisor and the formats used by the guest OS can be performed in real time by the authentication handler, and the security artifacts can be converted from any storage format used in the security DB to any appropriate format that is required by an instance of the guest OS. The security DB can be subject to the hypervisor's access controls in order to limit access to the centralized certificate and key store based on the identity (e.g., a user ID) associated with a request from the guest OS.

Figure 1A:
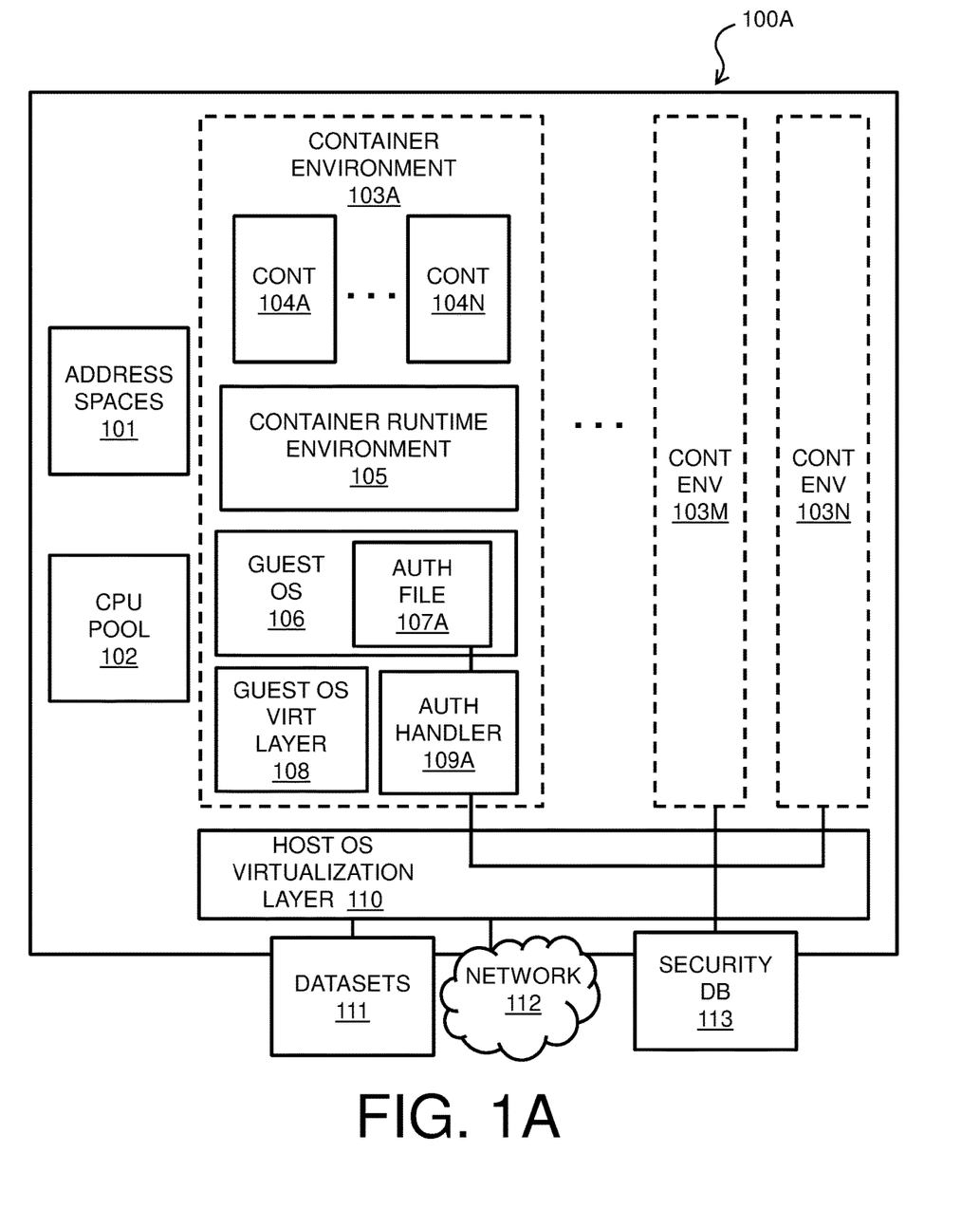
FIG. 1A is a block diagram of components of a system for integrated authentication for a container-based environment in accordance with one or more embodiments of the present invention.

Turning now to FIG. 1A, system 100A that includes integrated authentication for a container-based environment is generally shown in accordance with one or more embodiments of the present invention. Embodiments of system 100A can correspond to a cloud computing environment, such as is discussed below with respect to FIGS. 3 and 4, and can be implemented in conjunction with any appropriate computer system, including but not limited to computer system 500 of FIG. 5. System 100A includes a host system, including resources such as address spaces 101, central processing unit (CPU) pool 102, datasets 111, and network 112, that run a host OS virtualization layer 110 (also referred to as a hypervisor). Embodiments of the host OS virtualization layer 110 can include any appropriate OS, including but not limited to z/OS. Host OS virtualization layer 110 supports a number of virtualized container environments 103A-N. Each virtualized container environment of virtualized container environments 103A-N runs a guest OS such as guest OS 106 as is shown in virtualized container environment 103A. Guest OS 106 can include any appropriate OS, including but not limited to Linux. As shown in container environment 103A, each container environment of container environments 103A-N hosts a respective set of containers such as containers 104A-N. Each container of containers 104A-N can host one or more applications. The containers 104A-N are supported by a container runtime environment 105. In some embodiments of the invention, the container runtime environment 105 can include Docker®. The container runtime environment 105 is hosted by the guest OS 106 and guest OS virtualization layer 108. Each container environment of container environments 103A-N can include a respective instance of the container runtime environment 105, guest OS 106, and guest OS virtualization layer 108 as shown in container environment 103A. The container environments 103A-N can access the resources of the host system via guest OS virtualization layer 108 and host OS virtualization layer 110.

Security DB 113 can include a stored set of security artifacts, including but not limited to certificates and keys, for use in authentication operations. As shown in FIG. 1A, applications hosted in containers 104A-N in container environment 103A can access the security artifacts in security DB 113 via an authentication module including authentication file 107A and authentication handler 109A. Each of container environments 103A-N can include respective authentication files such as authentication file 107A, and an authentication handler such as authentication handler 109A, for communication with security DB 113. Authentication operations that can be performed in embodiments of system 100A via authentication file 107A and authentication handler 109A include, but are not limited to, a TLS/SSL connection from a virtual environment Docker daemon (e.g., container runtime environment 105) to an external Docker registry, to an LDAP server for user authentication, or to an HTTP/HTTPS proxy server. Operation of authentication file 107A and authentication handler 109A are discussed in further detail below with respect to method 200A of FIG. 2A.

In some embodiments of the invention, the names of security artifacts in the security DB 113 can be provided in container environment 103A via authentication file 107A. During the provision of the container environment 103A, the names of any security artifacts can be provided to the guest OS 106. The container environment 103A can create a mapping of security artifacts from security DB 113 to one or more authentication files such as authentication file 107A, and can place one or more authentication files such as authentication file 107A as placeholders at appropriate directory locations. For example, in some embodiments of the invention, for a private Docker registry, an authentication file 107A can be placed under the /etc/docker/certs.d directory; for an LDAP server, an authentication file 107A can be placed under/etc/ldap/ldap-ca; and for an HTTP/HTTPS proxy server, an authentication file 107A can be placed under /etc/certs.d/docker-proxy-ca. When an authentication file such as authentication file 107A is accessed by any of containers 104A-N, the authentication handler 109A can be invoked by the access to communicate locally with the underlying host OS virtualization layer 110 to request a security artifact corresponding to the access from the underlying security DB 113. The authentication file 107A can have a predefined special file extension, and the invoking of authentication handler 109A can be performed by guest OS 106 based on the predefined file extension of authentication file 107A. The authentication handler 109A can include an extended STHYI instruction that allows the guest OS 106 to communicate directly with the host OS virtualization layer 110 without requiring network access. The container environment 103A can run as a started task having an associated a user ID on the host OS virtualization layer 110, and the user ID can be used by authentication handler 109A authenticate with the security DB 113 and obtain any requested CA certificates from the appropriate key rings. The authentication handler 109A can convert the requested certificates from a format used in the security DB 113 into any appropriate format that is required by the container environment 103A.

In some embodiments of system 100A, the security artifacts in the security DB 113 can include certificates, and cleartext or encrypted private keys (e.g., such as are used by Integrated Cryptographic Service Facility, or ICSF), for use by server-side applications deployed inside the virtual environment, and by applications running inside the containers 104A-N that are supported by the guest OS 106. In some embodiments of system 100A, RACF can be the underlying host OS security product that is implemented in the security DB 113, and real and virtual key rings can be used for certificate and private key storage. A real keyring is explicitly defined and configured to include specific certificates and private keys corresponding to a user ID. A RACF virtual keyring is the set of all certificates and private keys owned by a user ID in the host environment corresponding to host OS virtualization layer 110. The set of certificates in a RACF key ring can be used by a user or server application to determine the trustworthiness of a client or peer. Each RACF user ID can be associated with a virtual keyring. A special certificate authority (CERTAUTH) virtual keyring can include all trusted CA certificates in the RACF database that comprises the security DB 113, and can be accessed by any user ID. Certificates associated with keyrings can be associated with user IDs, stored in security DB 113, and retrieved for application usage and peer verification via authentication file 107A and authentication handler 109A.

The RACF database that can comprise embodiments of security DB 113 can store certificates in an internal binary format, such as privacy-enhanced mail (PEM) format and Base64 encoded X.509 certificates. The PEM and Base64 formats are text formats, and may be transported by authentication handler 109A as text. In some embodiments of the invention, the authentication handler 109A can perform a conversion from extended binary coded decimal interchange code (EBCDIC) to American standard code for information exchange (ASCII) based on the certificate package format type and the guest OS 106. The authentication handler 109A can automatically convert from a RACF binary format into any format that is required by the virtualized container environment 103A. The certificates can be converted into any appropriate format by the authentication handler 109A for use in the guest OS 106, including but not limited to PEM format, public key cryptography standards (PKCS) #12 packages, or implementation-specific formats including but not limited to Java® keystores or OpenSSL key databases. The authentication handler 109A can serve the certificates in any required guest OS certificate format based on the type of certificate and the virtualization environment guest OS 106.

It is to be understood that the block diagram of FIG. 1A is not intended to indicate that the system 100A is to include all of the components shown in FIG. 1A. Rather, the system 100A can include any appropriate fewer or additional components not illustrated in FIG. 1A (e.g., additional memory components, embedded controllers, functional blocks, connections between functional blocks, modules, inputs, outputs, address spaces, CPUs, virtualized container environments, container runtime environments, guest OSes, guest OS virtualization layers, authentication files, authentication handlers, containers, applications, security databases, etc.).

Further, the embodiments described herein with respect to system 100A may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 1B:
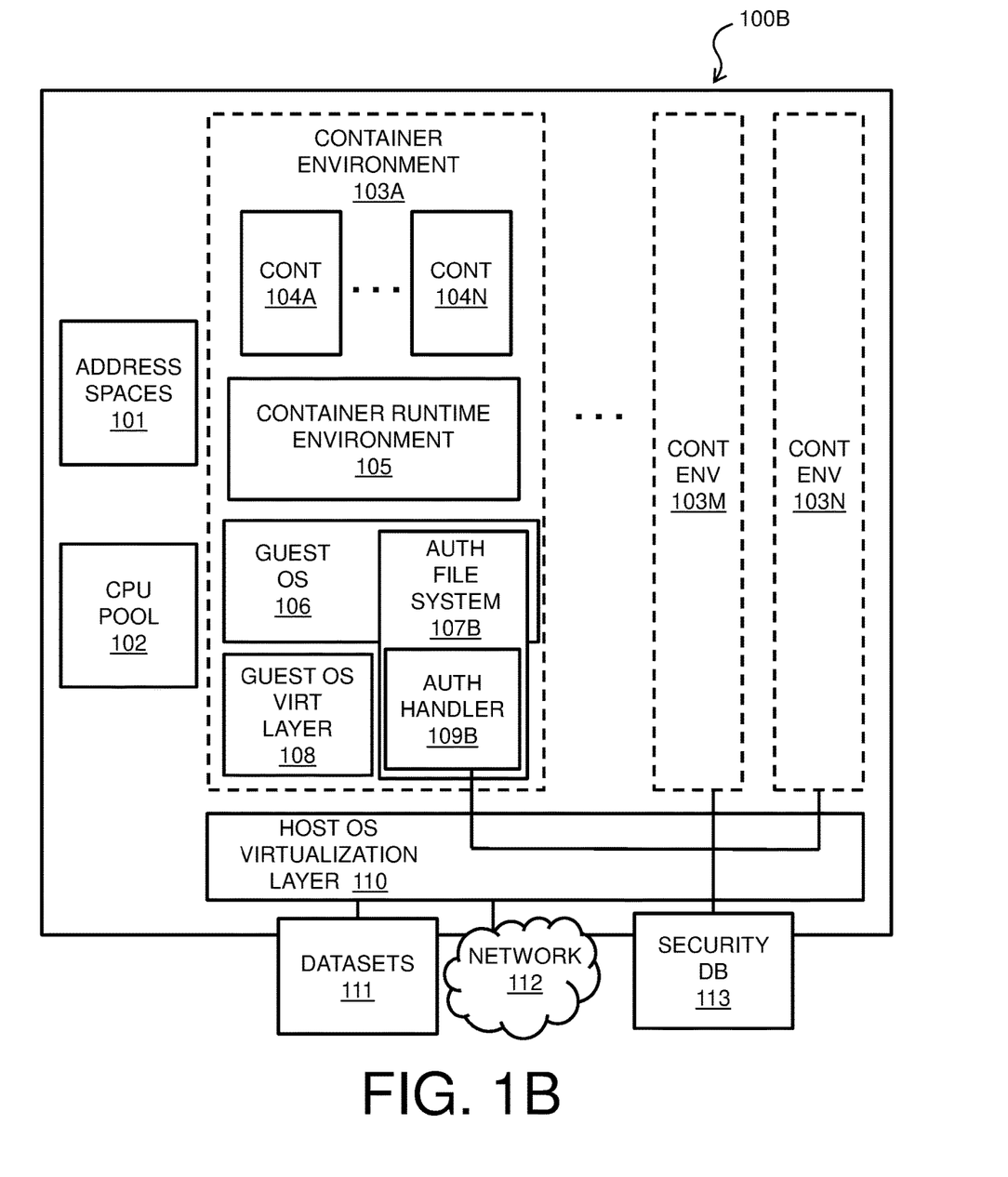
FIG. 1B is a block diagram of components of a system for integrated authentication for a container-based environment in accordance with one or more embodiments of the present invention.

Turning now to FIG. 1B, system 100B that includes integrated authentication for a container-based environment is generally shown in accordance with one or more embodiments of the present invention. Embodiments of system 100B can correspond to a cloud computing environment, such as is discussed below with respect to FIGS. 3 and 4, and can be implemented in conjunction with any appropriate computer system, including but not limited to computer system 500 of FIG. 5. System 100B includes a host system, including resources such as address spaces 101, central processing unit (CPU) pool 102, datasets 111, and network 112, that run a host OS virtualization layer 110 (also referred to as a hypervisor). Embodiments of the host OS virtualization layer 110 can include any appropriate OS, including but not limited to z/OS. Host OS virtualization layer 110 supports a number of virtualized container environments 103A-N. Each virtualized container environment of virtualized container environments 103A-N runs a guest OS such as guest OS 106 as is shown in virtualized container environment 103A. Guest OS 106 can include any appropriate OS, including but not limited to Linux. As shown in container environment 103A, each container environment of container environments 103A-N hosts a respective set of containers such as containers 104A-N. Each container of containers 104A-N can host one or more applications. The containers 104A-N are supported by a container runtime environment 105. In some embodiments of the invention, the container runtime environment 105 can include Docker®. The container runtime environment 105 is hosted by the guest OS 106 and guest OS virtualization layer 108. Each container environment of container environments 103A-N can include a respective instance of the container runtime environment 105, guest OS 106, and guest OS virtualization layer 108 as shown in container environment 103A. The container environments 103A-N can access the resources of the host system via guest OS virtualization layer 108 and host OS virtualization layer 110.

Security DB 113 can include a stored set of security artifacts, including but not limited to certificates and keys, for use in authentication operations. As shown in FIG. 1B, applications hosted in containers 104A-N in container environment 103A can access the security artifacts in security DB 113 via an authentication module including an authentication file system 107B, which includes authentication handler 109B. Each of container environments 103A-N can include respective a respective authentication file system 107B such as authentication file system 107B, including a respective authentication handler such as authentication handler 109B, for communication with security DB 113. Authentication operations that can be performed in embodiments of system 100B via authentication file system 107B and authentication handler 109B include, but are not limited to, a TLS/SSL connection from a virtual environment Docker daemon (e.g., container runtime environment 105) to an external Docker registry, to an LDAP server for user authentication, or to an HTTP/HTTPS proxy server. Operation of authentication file system 107B and authentication handler 109B are discussed in further detail below with respect to method 200B of FIG. 2B.

In some embodiments of the invention, the names of security artifacts in the security DB 113 can be provided in container environment 103A via placeholder files in authentication file system 107B. Authentication file system 107B can include a mapping of security artifacts from security DB 113 to one or more placeholder files in the authentication file system 107B. The placeholder files in the authentication file system 107B can correspond to symbolic links that are mounted at appropriate locations in the regular file system of the guest OS 106. For example, in some embodiments of the invention, for a private Docker registry, a symbolic link to a placeholder file in authentication file system 107B can be included in a /etc/docker/certs.d directory; for an LDAP server, a symbolic link to a placeholder file in authentication file system 107B can be included in a /etc/ldap/ldap-ca directory; and for an HTTP/HTTPS proxy server, a symbolic link to a placeholder file in authentication file system 107B can be included in a /etc/certs.d/docker-proxy-ca directory in the regular file system of the guest OS 106. Based on an application accessing a symbolic link in order to perform an authentication operation, the file access request can be redirected by the guest OS 106 to the placeholder file in the authentication file system 107B that corresponds to the symbolic link. When any placeholder file in authentication file system 107B is accessed by any of containers 104A-N, the authentication handler 109B in authentication file system 107B can be invoked to communicate locally with the underlying host OS virtualization layer 110 to request a security artifact corresponding to the access from the underlying security DB 113. The authentication handler 109B can include an extended STHYI instruction that allows the guest OS 106 to communicate directly with the host OS virtualization layer 110 without requiring network access. The container environment 103A can run as a started task having an associated a user ID on the host OS virtualization layer 110, and the user ID can be used by authentication handler 109B authenticate with the security DB 113 and obtain any requested CA certificates from the appropriate key rings. The authentication handler 109B can convert the requested certificates from a format used in the security DB 113 into any appropriate format that is required by the container environment 103A. In some embodiments of system 100B, the authentication file system 107B can include file system in user space (FUSE). Embodiments of a system 100B including an authentication file system 107B may not require any kernel changes to the guest OS 106. Any additional metadata that may be needed in container environment 103A can be maintained in authentication file system 107B.

In some embodiments of system 100B, the security artifacts in the security DB 113 can include certificates, and cleartext or encrypted private keys (e.g., such as are used by ICSF), for use by server-side applications deployed inside the virtual environment, and by applications running inside the containers 104A-N that are supported by the guest OS 106. In some embodiments of system 100B, RACF can be the underlying host OS security product that is implemented in the security DB 113, and real and virtual key rings can be used for certificate and private key storage. A real keyring is explicitly defined and configured to include specific certificates and private keys corresponding to a user ID. A RACF virtual keyring is the set of all certificates and private keys owned by a user ID in the host environment corresponding to host OS virtualization layer 110. The set of certificates in a RACF key ring can be used by a user or server application to determine the trustworthiness of a client or peer. Each RACF user ID can be associated with a virtual keyring. A special certificate authority (CERTAUTH) virtual keyring can include all trusted CA certificates in the RACF database that comprises the security DB 113, and can be accessed by any user ID. Certificates associated with keyrings can be associated with user IDs, stored in security DB 113, and retrieved for application usage and peer verification by authentication file system 107B and authentication handler 109B.

The RACF database that can comprise embodiments of security DB 113 can store certificates in an internal binary format, such as privacy-enhanced mail (PEM) format and Base64 encoded X.509 certificates. The PEM and Base64 formats are text formats, and may be transported by authentication handler 109B as text. In some embodiments of the invention, the authentication handler 109B can perform a conversion from extended binary coded decimal interchange code (EBCDIC) to American standard code for information exchange (ASCII) based on the certificate package format type and the guest OS 106. The authentication handler 109B can automatically convert from a RACF binary format into any format that is required by the virtualized container environment 103A. Some conversions by authentication handler 109B may require metadata stored within the authentication file system 107B, or can be performed based on configuration parameters that are set during mounting of the authentication file system 107B. The certificates can be converted into any appropriate format by the authentication handler 109B for use in the guest OS 106, including but not limited to PEM format, public key cryptography standards (PKCS) #12 packages, or implementation-specific formats including but not limited to Java® keystores or OpenSSL key databases. The authentication handler 109B can serve the certificates in any required guest OS certificate format based on the type of certificate and the virtualization environment guest OS 106.

It is to be understood that the block diagram of FIG. 1B is not intended to indicate that the system 100B is to include all of the components shown in FIG. 1B. Rather, the system 100B can include any appropriate fewer or additional components not illustrated in FIG. 1B (e.g., additional memory components, embedded controllers, functional blocks, connections between functional blocks, modules, inputs, outputs, address spaces, CPUs, virtualized container environments, container runtime environments, guest OSes, guest OS virtualization layers, authentication file systems, authentication handlers, containers, applications, security databases, etc.). Further, the embodiments described herein with respect to system 100B may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2A:
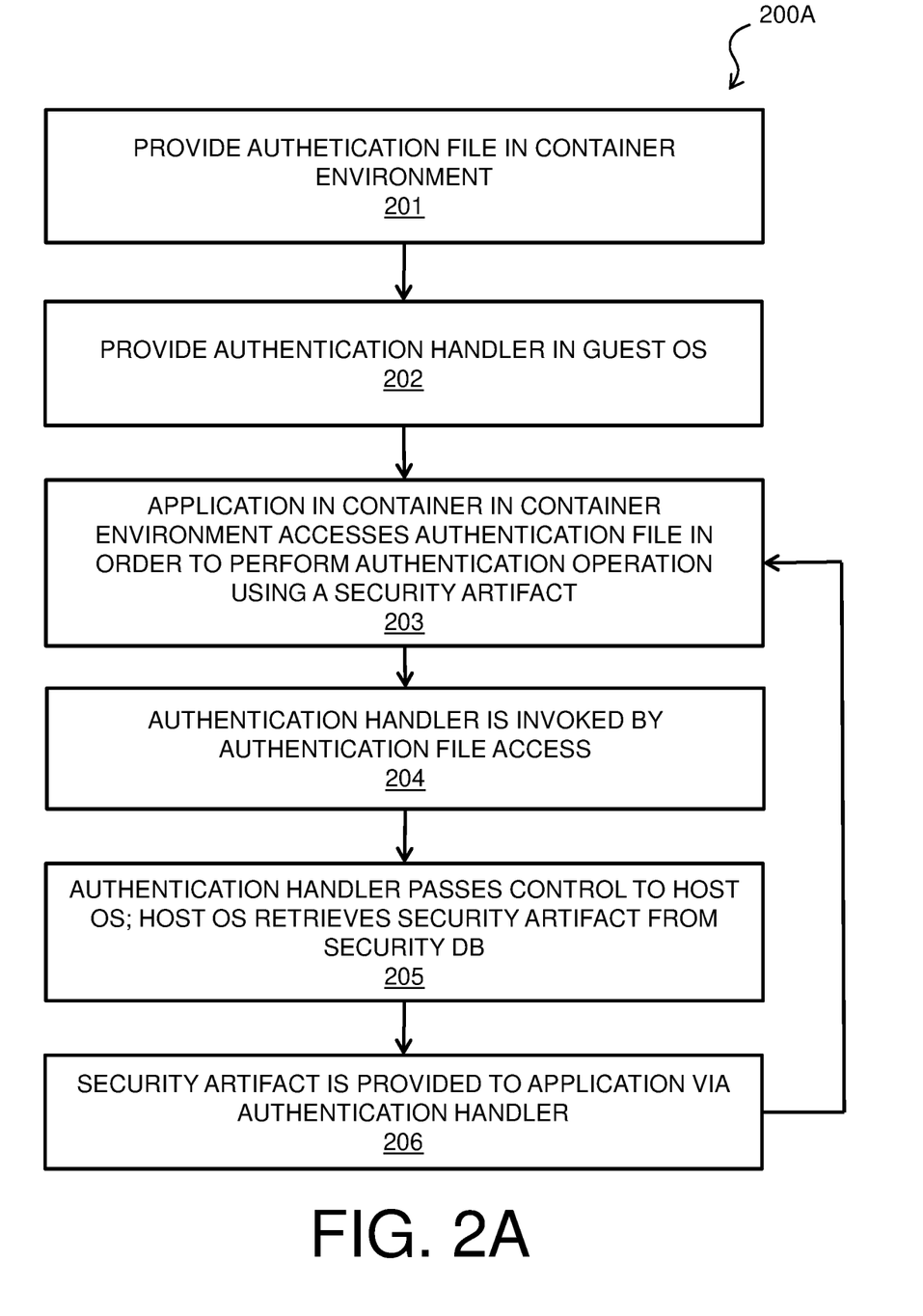
FIG. 2A is a flow diagram of a process for integrated authentication for a container-based environment in accordance with one or more embodiments of the present invention.

FIG. 2A shows a process flow diagram of a method 200A for integrated authentication for a container-based environment in accordance with one or more embodiments of the present invention. Embodiments of method 200A can be implemented in, and are discussed with reference to, system 100A of FIG. 1A. In block 201 of method 200A, one or more authentication files such as authentication file 107A is provided at a predefined location in the container environment 103A. For example, for a container environment 103A including a container runtime environment comprising a private Docker registry, authentication file 107A can be placed under the /etc/docker/certs.d directory; for an LDAP server, authentication file 107A can be placed under /etc/ ldap/ldap-ca; and for an HTTP/HTTPS proxy server, authentication file 107A can be placed under /etc/certs.d/docker-proxy-ca. Authentication files such as authentication file 107A can be placed at any appropriate location in a container environment such as container environment 103A. The authentication files, such as authentication file 107A, may have a predefined file extension. The predefined file extension can have any appropriate format (e.g., symbolic link, character special, pipe, or socket file types). In block 202, an authentication handler 109A is provided in the container environment 103A. Provision of the authentication handler 109A may include modification of the kernel of the guest OS 106.

In block 203 of method 200A, an application in a container 104A in the container environment 103A accesses authentication file 107A in order to request a security artifact to perform an authentication operation. In block 204, the authentication handler 109A is invoked by the accessing of the authentication file 107A that occurred in block 203. The authentication handler 109A can be invoked by guest OS 106 based on the file extension of the accessed authentication file 107A. In block 205, the invoked authentication handler 109A passes control to the host OS virtualization layer 110 to retrieve the requested security artifact from security DB 113. In some embodiments of the invention, the authentication handler 109A can implement STHYI interface calls to communicate with the host OS virtualization layer 110 in block 205. In some embodiments of block 205, the retrieval of the requested security artifact from security DB 113 can be performed based on a user ID associated with the requesting application. In block 206, the requested security artifact is provided to the requesting application from security DB 113 and the host OS virtualization layer 110 via the security handler 1109A. In some embodiments of block 206, the authentication handler 109A can automatically convert the security artifact from the format used in the security DB 113 into a format that is usable by the requesting application in container 104A. The format translation of block 206 can be performed based on a file extension of the security artifact. Blocks 203 to 206 of method 200A can be repeated throughout operation of system 100A in order for applications running in container environments 103A-N to access security artifacts in security DB 113.

The process flow diagram of FIG. 2A is not intended to indicate that the operations of the method 200A are to be executed in any particular order, or that all of the operations of the method 200A are to be included in every case. Additionally, the method 200A can include any suitable number of additional operations.

Figure 2B:
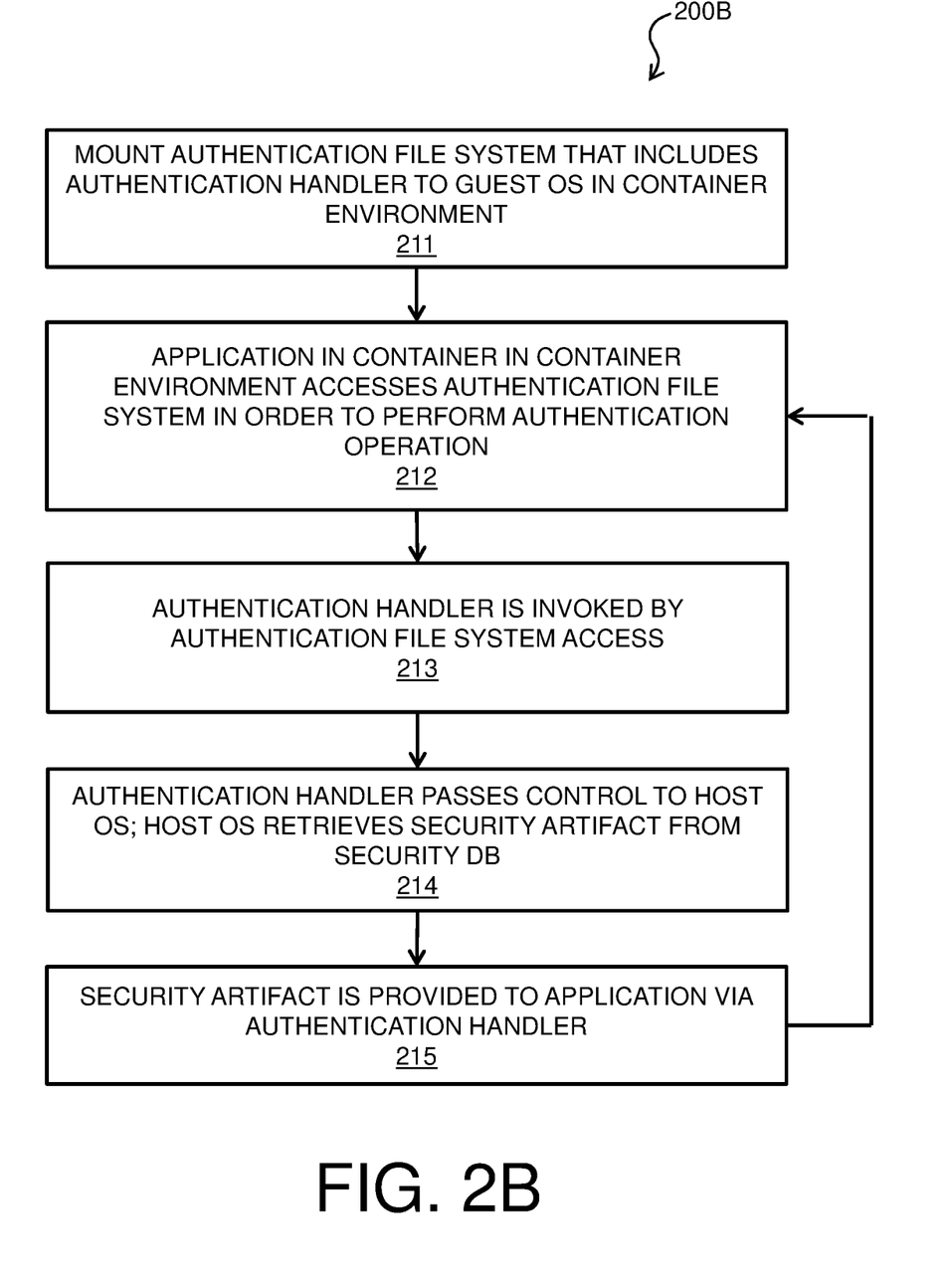
FIG. 2B is a flow diagram of a process for integrated authentication for a container-based environment in accordance with one or more embodiments of the present invention.

FIG. 2B shows a process flow diagram of a method 200B for integrated authentication for a container-based environment in accordance with one or more embodiments of the present invention. Embodiments of method 200B can be implemented in, and are discussed with reference to, system 100B of FIG. 1B. In block 211 of method 200B, an authentication file system 107B is mounted to guest OS 106 in a predefined location in the container environment 103A. The authentication file system 107B includes one or more placeholder files and an authentication handler 109B. Placeholder files can be placed at any appropriate location in authentication files system 107B. The placeholder files can correspond to symbolic links located at appropriate locations in the regular file system of the guest OS 106. For example, in some embodiments of the invention, for a private Docker registry, a symbolic link to a placeholder file in authentication file system 107B can be included in a /etc/docker/certs.d directory; for an LDAP server, a symbolic link to a placeholder file in authentication file system 107B can be included in a /etc/ldap/ldap-ca directory; and for an HTTP/HTTPS proxy server, a symbolic link to a placeholder file in authentication file system 107B can be included in a /etc/certs.d/docker-proxy-ca directory in the regular file system of the guest OS 106. In some embodiments of the invention, mounting of the authentication file system 107B that includes authentication handler 109B in container environment 103A may not require modification of the kernel of guest OS 106.

In block 212 of method 200B, an application in a container 104A in the container environment 103A accesses a placeholder file in the authentication file system 107B in order to request a security artifact to perform an authentication operation. The application can access a symbolic link in the regular file system of the guest OS 106 in order to request the security artifact, and the access is redirected by guest OS 106 to the placeholder file corresponding to the accessed symbolic link in the authentication file system 107B. In block 213, the authentication handler 109B is invoked by the accessing of the placeholder file in the authentication file system 107B that occurred in block 212. In block 214, the authentication handler 109B passes control to the host OS virtualization layer 110 to retrieve the requested security artifact from security DB 113. In some embodiments of the invention, the authentication handler 109B can implement STHYI interface calls to communicate with the host OS virtualization layer 110 in block 214. In some embodiments of block 214, the retrieval of the requested security artifact from security DB 113 can be performed based on a user ID associated with the requesting application. In block 215, the security artifact is provided to the requesting application from security DB 113 and the host OS virtualization layer 110 via the security handler 1109B. In some embodiments of block 215, the authentication handler 109B can automatically convert the security artifact from a format that is used in security DB 113 into a format that is usable by the requesting application. The format translation of block 215 can be performed based on a file extension of the security artifact. Blocks 212 to 215 of method 200B can be repeated throughout operation of system 100B in order for applications running in container environments 103A-N to access security artifacts in security DB 113.

The process flow diagram of FIG. 2B is not intended to indicate that the operations of the method 200B are to be executed in any particular order, or that all of the operations of the method 200B are to be included in every case. Additionally, the method 200B can include any suitable number of additional operations.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3:
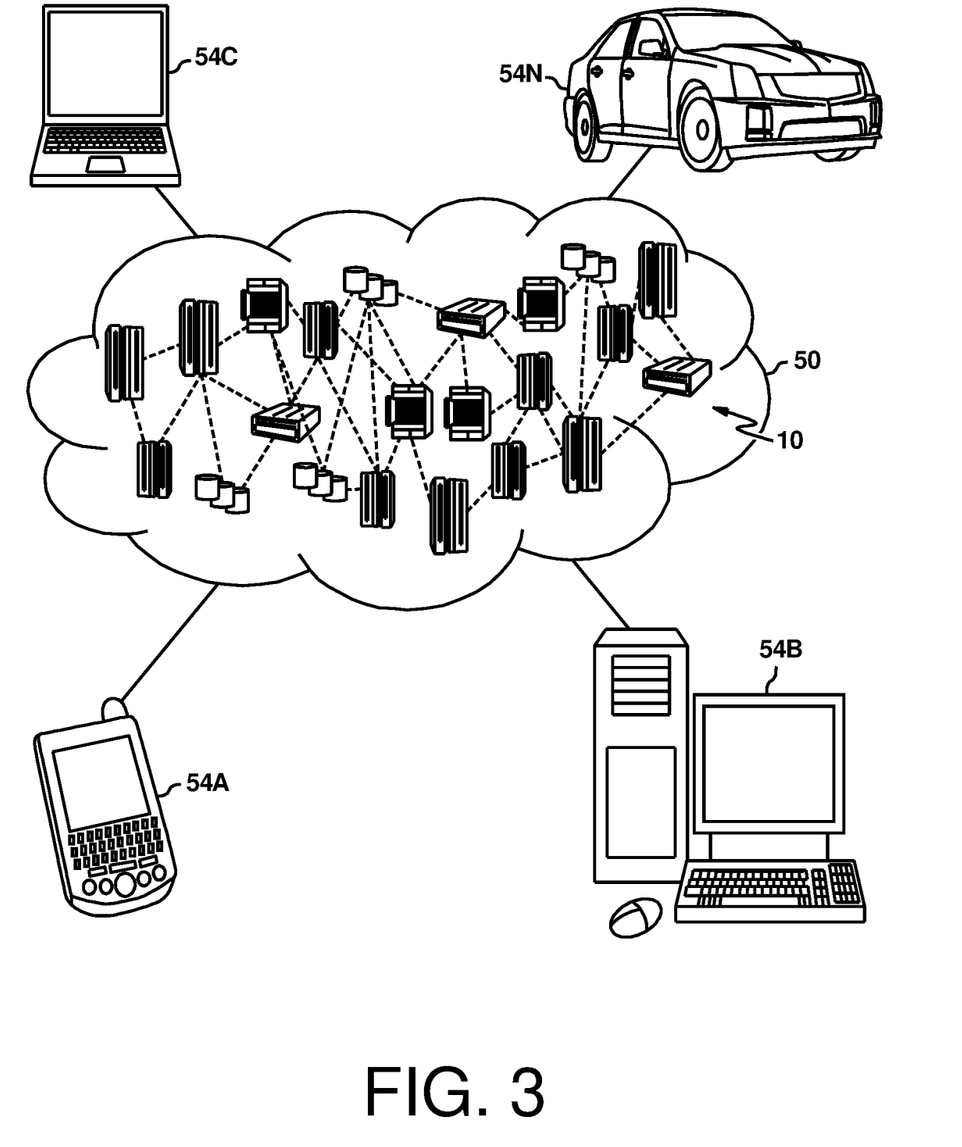
FIG. 3 depicts a cloud computing environment according to an embodiment of the present invention.

Referring now to FIG. 3, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 3 are intended to be illustrative only and that computing nodes 10 and cloud computing environment 50 can communicate with any type of computerized device over any type of network and/or network addressable connection (e.g., using a web browser).

Figure 4:
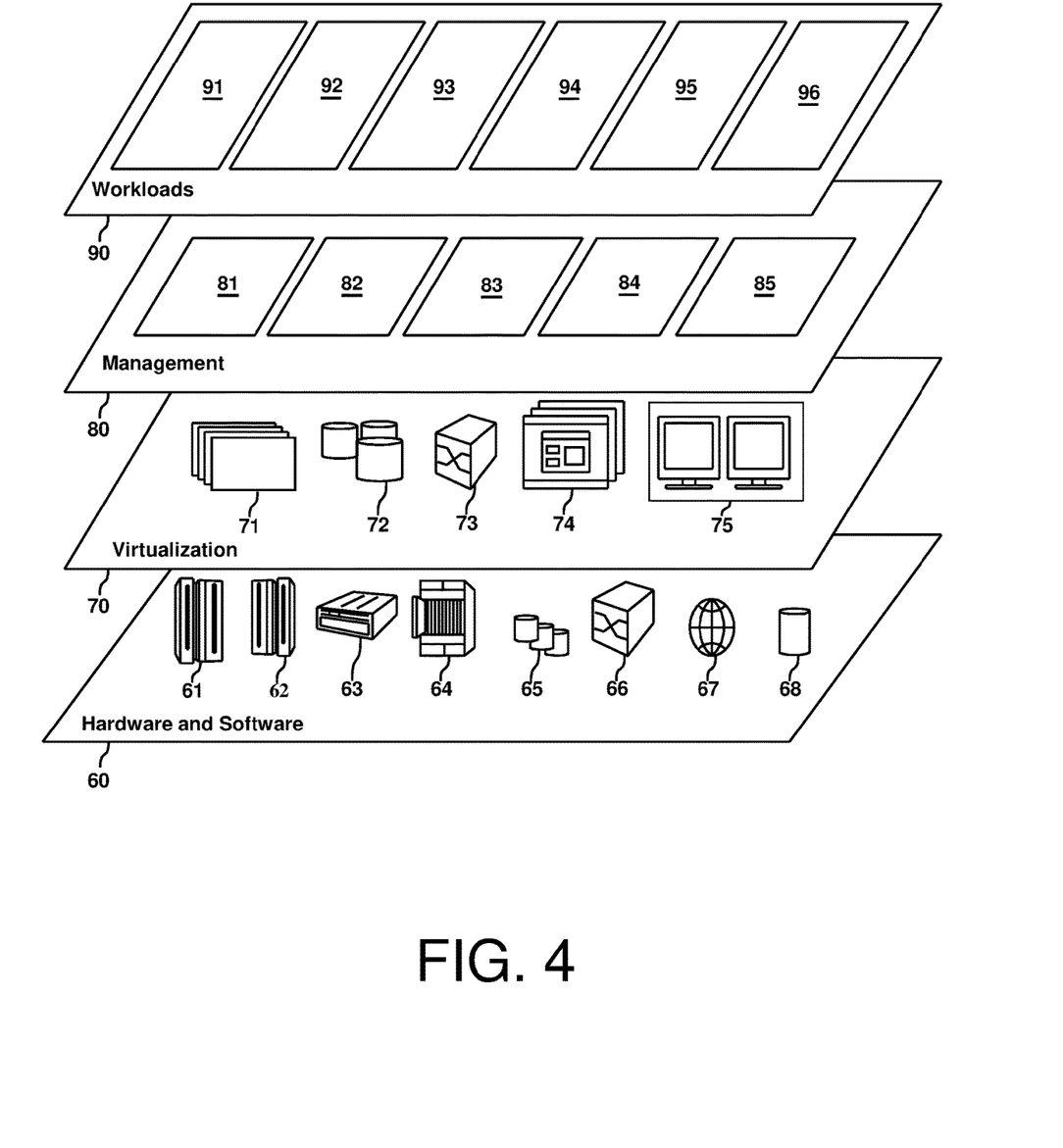
FIG. 4 depicts abstraction model layers according to an embodiment of the present invention.

Referring now to FIG. 4, a set of functional abstraction layers provided by cloud computing environment 50 (FIG. 1) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described herein. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

Figure 5:
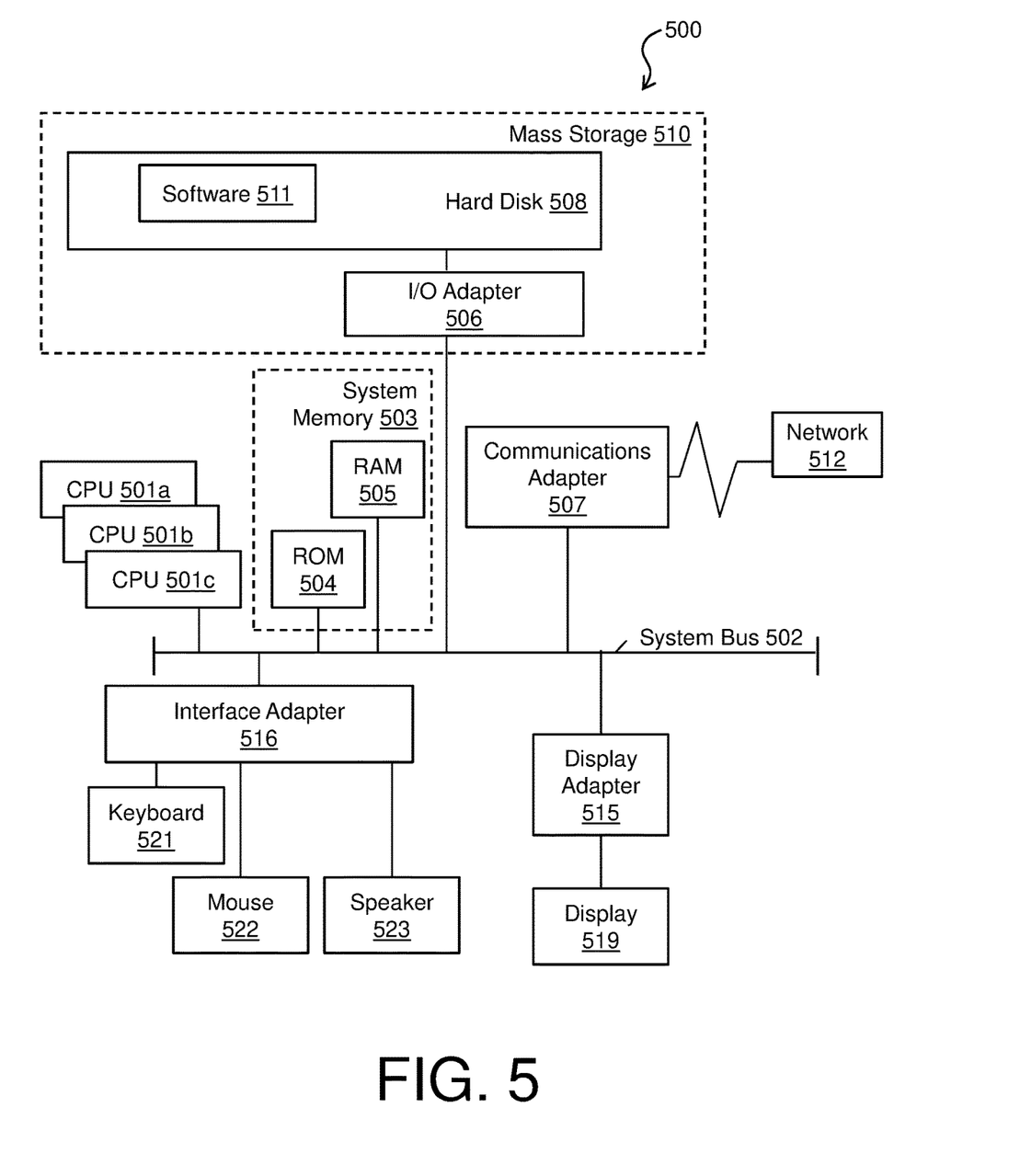
FIG. 5 is a block diagram of an example computer system for use in conjunction with one or more embodiments of integrated authentication for a container-based environment.

Turning now to FIG. 5, a computer system 500 is generally shown in accordance with an embodiment. The computer system 500 can be an electronic, computer framework comprising and/or employing any number and combination of computing devices and networks utilizing various communication technologies, as described herein. The computer system 500 can be easily scalable, extensible, and modular, with the ability to change to different services or reconfigure some features independently of others. The computer system 500 may be, for example, a server, desktop computer, laptop computer, tablet computer, or smartphone. In some examples, computer system 500 may be a cloud computing node. Computer system 500 may be described in the general context of computer system executable instructions, such as program modules, being executed by a computer system. Generally, program modules may include routines, programs, objects, components, logic, data structures, and so on that perform particular tasks or implement particular abstract data types. Computer system 500 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, the computer system 500 has one or more central processing units (CPU(s)) 501a, 501b, 501c, etc. (collectively or generically referred to as processor(s) 501). The processors 501 can be a single-core processor, multi-core processor, computing cluster, or any number of other configurations. The processors 501, also referred to as processing circuits, are coupled via a system bus 502 to a system memory 503 and various other components. The system memory 503 can include a read only memory (ROM) 504 and a random access memory (RAM) 505. The ROM 504 is coupled to the system bus 502 and may include a basic input/output system (BIOS), which controls certain basic functions of the computer system 500. The RAM is read-write memory coupled to the system bus 502 for use by the processors 501. The system memory 503 provides temporary memory space for operations of said instructions during operation. The system memory 503 can include random access memory (RAM), read only memory, flash memory, or any other suitable memory systems.

The computer system 500 comprises an input/output (I/O) adapter 506 and a communications adapter 507 coupled to the system bus 502. The I/O adapter 506 may be a small computer system interface (SCSI) adapter that communicates with a hard disk 508 and/or any other similar component. The I/O adapter 506 and the hard disk 508 are collectively referred to herein as a mass storage 510.

Software 511 for execution on the computer system 500 may be stored in the mass storage 510. The mass storage 510 is an example of a tangible storage medium readable by the processors 501, where the software 511 is stored as instructions for execution by the processors 501 to cause the computer system 500 to operate, such as is described herein with respect to the various Figures. Examples of computer program product and the execution of such instruction is discussed herein in more detail. The communications adapter 507 interconnects the system bus 502 with a network 512, which may be an outside network, enabling the computer system 500 to communicate with other such systems. In one embodiment, a portion of the system memory 503 and the mass storage 510 collectively store an operating system, which may be any appropriate operating system, such as the z/OS or AIX operating system from IBM Corporation, to coordinate the functions of the various components shown in FIG. 5.

Additional input/output devices are shown as connected to the system bus 502 via a display adapter 515 and an interface adapter 516 and. In one embodiment, the adapters 506, 507, 515, and 516 may be connected to one or more I/O buses that are connected to the system bus 502 via an intermediate bus bridge (not shown). A display 519 (e.g., a screen or a display monitor) is connected to the system bus 502 by a display adapter 515, which may include a graphics controller to improve the performance of graphics intensive applications and a video controller. A keyboard 521, a mouse 522, a speaker 523, etc. can be interconnected to the system bus 502 via the interface adapter 516, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 5, the computer system 500 includes processing capability in the form of the processors 501, and storage capability including the system memory 503 and the mass storage 510, input means such as the keyboard 521 and the mouse 522, and output capability including the speaker 523 and the display 519.

In some embodiments, the communications adapter 507 can transmit data using any suitable interface or protocol, such as the internet small computer system interface, among others. The network 512 may be a cellular network, a radio network, a wide area network (WAN), a local area network (LAN), or the Internet, among others. An external computing device may connect to the computer system 500 through the network 512. In some examples, an external computing device may be an external webserver or a cloud computing node.

It is to be understood that the block diagram of FIG. 5 is not intended to indicate that the computer system 500 is to include all of the components shown in FIG. 5. Rather, the computer system 500 can include any appropriate fewer or additional components not illustrated in FIG. 5 (e.g., additional memory components, embedded controllers, modules, additional network interfaces, etc.). Further, the embodiments described herein with respect to computer system 500 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted, or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
accessing, by an application that is running in a container in a container environment that is hosted by a hypervisor on a host system, an authentication module that is located in the container environment, wherein the authentication module comprises an authentication file system that is mounted to a guest operating system (OS) of the container environment;
invoking an authentication handler in the container environment based on the accessing of the authentication module;
passing control to the hypervisor from the authentication handler;
retrieving a security artifact from a security database of the host system by the hypervisor;
providing the retrieved security artifact to the application via the authentication handler; and performing an authentication operation by the application using the security artifact,
wherein the authentication file system includes a placeholder file that is accessed by the application based on a symbolic link in a regular file system of the guest OS in order to perform the authentication operation, and
wherein the authentication file system also includes a mapping of security artifacts stored in the security database to placeholder files stored in the authentication file system.

2. The method of claim 1, wherein the authentication module comprises an authentication file that is accessed by the application in order to perform the authentication operation, wherein a location of the authentication file in the container environment corresponds to a type of the security artifact.

3. The method of claim 2, wherein the authentication handler is invoked based on a file extension of the authentication file.

4. The method of claim 1, wherein a location of the symbolic link corresponds to a type of the security artifact.

5. The method of claim 1, wherein the authentication handler is located in the authentication file system.

6. The method of claim 1, wherein providing the retrieved security artifact to the application via the authentication handler comprises converting, by the authentication handler, the security artifact from a first format that is used for storage in the security database to a second format that is required for use by the application, wherein the conversion is based on file extension of the security artifact.

7. A system comprising:
a memory having computer readable instructions; and
one or more processors for executing the computer readable instructions, the computer readable instructions controlling the one or more processors to perform operations comprising:
accessing, by an application that is running in a container in a container environment that is hosted by a hypervisor on a host system, an authentication module that is located in the container environment, wherein the authentication module comprises an authentication file system that is mounted to a guest operating system (OS) of the container environment;
invoking an authentication handler in the container environment based on the accessing of the authentication module;
passing control to the hypervisor from the authentication handler;
retrieving a security artifact from a security database of the host system by the hypervisor;
providing the retrieved security artifact to the application via the authentication handler; and
performing an authentication operation by the application using the security artifact,
wherein the authentication file system includes a placeholder file that is accessed by the application based on a symbolic link in a regular file system of the guest OS in order to perform the authentication operation, and
wherein the authentication file system also includes a mapping of security artifacts stored in the security database to placeholder files stored in the authentication file.

8. The system of claim 7, wherein the authentication module comprises an authentication file that is accessed by the application in order to perform the authentication operation, wherein a location of the authentication file in the container environment corresponds to a type of the security artifact.

9. The system of claim 8, wherein the authentication handler is invoked based on a file extension of the authentication file.

10. The system of claim 7, wherein a location of the symbolic link corresponds to a type of the security artifact.

11. The system of claim 7, wherein the authentication handler is located in the authentication file system.

12. The system of claim 7, wherein providing the retrieved security artifact to the application via the authentication handler comprises converting, by the authentication handler, the security artifact from a first format that is used for storage in the security database to a second format that is required for use by the application, wherein the conversion is based on file extension of the security artifact.

13. A computer program product comprising a computer readable storage medium having program instructions embodied therewith, the program instructions executable by one or more processors to cause the one or more processors to perform operations comprising:
accessing, by an application that is running in a container in a container environment that is hosted by a hypervisor on a host system, an authentication module that is located in the container environment, wherein the authentication module comprises an authentication file system that is mounted to a guest operating system (OS) of the container environment;
invoking an authentication handler in the container environment based on the accessing of the authentication module;
passing control to the hypervisor from the authentication handler;
retrieving a security artifact from a security database of the host system by the hypervisor;
providing the retrieved security artifact to the application via the authentication handler; and
performing an authentication operation by the application using the security artifact,
wherein the authentication file system includes a placeholder file that is accessed by the application based on a symbolic link in a regular file system of the guest OS in order to perform the authentication operation, and
wherein the authentication file system also includes a mapping of security artifacts stored in the security database to placeholder files stored in the authentication file.

14. The computer program product of claim 13, wherein the authentication module comprises an authentication file that is accessed by the application in order to perform the authentication operation, wherein a location of the authentication file in the container environment corresponds to a type of the security artifact.

15. The computer program product of claim 14, wherein the authentication handler is invoked based on a file extension of the authentication file.

16. The computer program product of claim 13, wherein a location of the symbolic link corresponds to a type of the security artifact.

17. The computer program product of claim 13, wherein the authentication handler is located in the authentication file system.

* * * * *